Patented May 24, 1927.

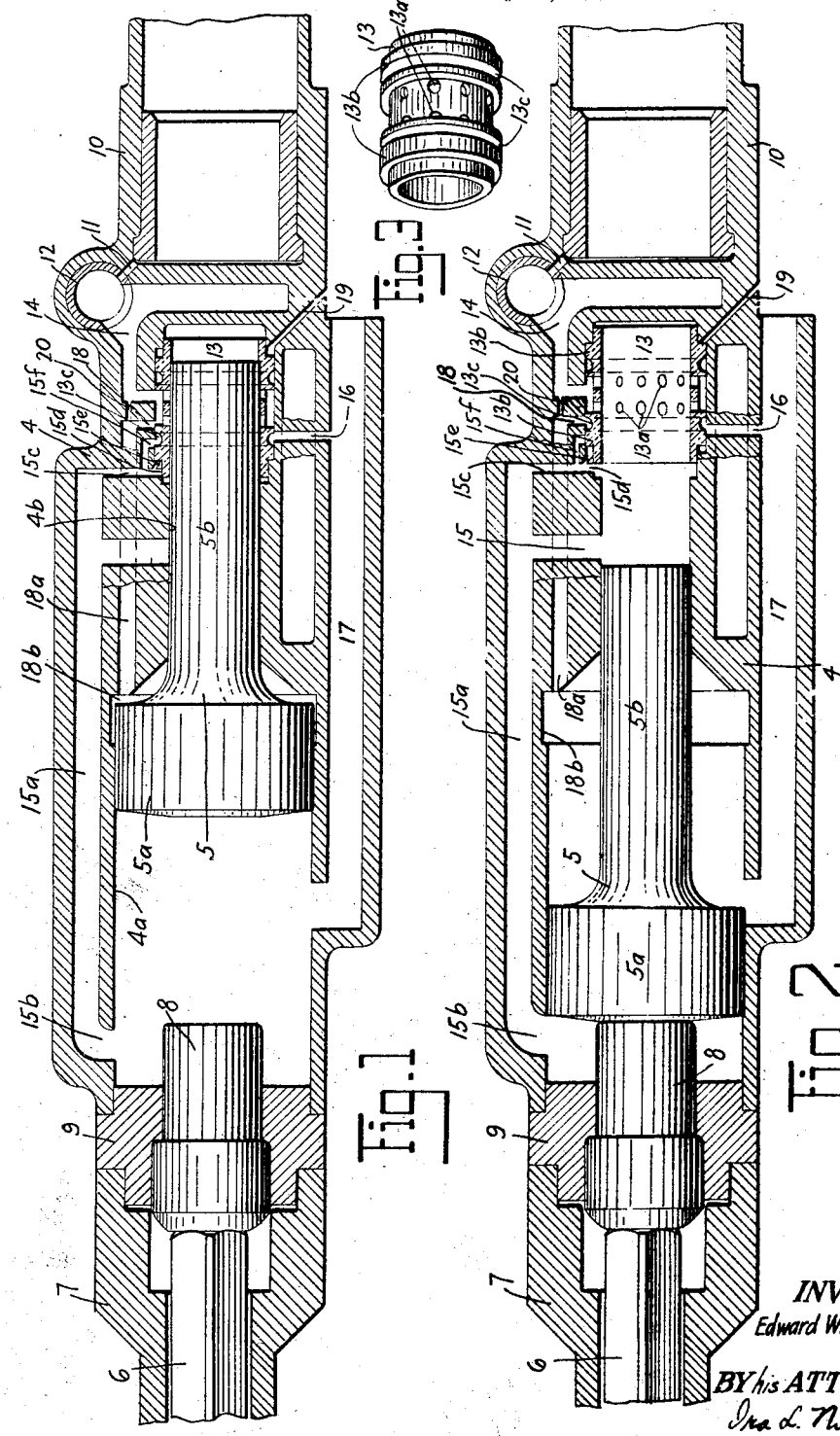

1,629,845

UNITED STATES PATENT OFFICE.

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY.

PNEUMATIC PERCUSSIVE TOOL.

Application filed May 23, 1925. Serial No. 32,250.

This invention relates to fluid pressure percussive tools of the type utilizing a two diameter piston providing two pressure areas for driving it in one direction and a single pressure area for returning it.

One object of the invention is to provide a tool of the class described in which external projections are avoided thereby making it compact and of relatively light weight. Another object is to provide a tool having superior running characteristics. Other objects will appear from the detailed description which follows.

In order to illustrate the invention a preferred embodiment thereof is shown in the accompanying drawings, in which:

Fig. 1 is a longitudinal sectional view;

Fig. 2 is a view similar to Fig. 1 showing the movable parts in a different position; and Fig. 3 is a perspective view of the automatic controlling valve.

The embodiment of the invention shown comprises a stoping drill having the cylinder 4 providing a piston chamber in which reciprocates a hammer piston 5 arranged to deliver blows upon a working tool or drill steel 6, supported in a front head or chuck 7, either directly or through an anvil block 8 which may be mounted in a guide member 9 interposed between cylinder 4 and chuck 7. The tool is provided at its rear end with a feed cylinder 10 within which is mounted for sliding movement a feed piston (not shown) actuated by motive fluid admitted through a restricted port 11 under control of a throttle valve 12 for moving the drill bodily to its work. The piston chamber is differential in size having a large bore $4^a$ and a small bore $4^b$ and the piston 5 corresponds thereto comprising a head $5^a$ fitting the large bore $4^a$ and a stem $5^b$ fitting the small bore $4^b$. Disposed in a counterbore in the rear end of small bore $4^b$ is a sleeve valve 13 defining a portion of the small piston chamber and arranged for movement in timed relation with piston 5. The valve, shown in perspective in Fig. 3, takes the form of a tube or sleeve having air inlet ports $13^a$ therethrough adjacent its center and provided on its exterior intermediate ports $13^a$ and its ends with projecting flanges $13^b$. These flanges have on their outer faces grooves $13^c$ for a purpose presently to be described. While a single annular series of large inlet ports $13^a$ may be provided, it is preferred to use two spaced annular series of small ports as shown in order to prevent the valve from being unduly weakened at this point. The flanges $13^b$ are symmetrically disposed on valve 13 and grooves $13^c$ are symmetrically disposed upon flanges $13^b$ in order to make the valve reversible.

In the reciprocation of the piston 5 the stem $5^b$ passes within the valve 13 as indicated in Fig. 1 thus controlling the admission of motive fluid from live air chamber 14 through ports $13^a$ to the small bore of the piston chamber. The stem $5^b$ also controls a port 15 communicating with a passage $15^a$ opening into the front end of the large piston bore $4^a$ through a port $15^b$. A communicating passage $15^c$ extends to the rear and communicates with a port $15^d$ in rearward spaced relation with port 15, the port $15^d$ being closed by the forward end of the valve when the latter is in position shown in Fig. 1 and being uncovered by the valve so as to be under control of the piston stem $5^b$ when the valve is in the position shown in Fig. 2. A branch passage $15^e$ leads to the forward face of the forward flange $13^b$ of the valve and still another branch $15^f$ is arranged to be controlled by the said flange $13^b$, the latter closing branch $15^f$ when in the position shown in Fig. 2 and opening it to exhaust through its groove $13^c$ and passage 16 which communicates with the main piston controlled exhaust passage 17 which communicates directly with atmosphere. The forward flange $13^b$ of the valve further controls the admission and exhaust of motive fluid to the rear face of piston head $5^a$, motive fluid passing to the same when the valve is in the forward position (Fig. 1) around the central neck of the valve, through port 18, and connecting passage $18^a$ which communicates with an annular groove $18^b$ in the rear end of the piston bore $4^a$. In the rearward position of the valve (Fig. 2) port 18 communicates with forward groove $13^c$ of the valve which connects in both positions of the valve with the auxiliary exhaust port 16. An exhaust passage 19 vents the rear face of the rearward flange $13^b$ of the valve to permit movement of the valve to the position shown in Fig. 2.

The operation of the tool is briefly as follows: Assuming the parts to be in the position shown in Fig. 1 valve 13 has just shifted forwardly as a result of the pressure of the air trapped in the rearward end of bore 4ᵇ which was effective on the pressure surface of the valve provided by the rear edge thereof. The motive fluid passes from the live air chamber 14, around the central neck of the valve, through port 18 and passage 18ᵃ to the rear head of the piston driving the latter forwardly. As the piston stem 5ᵇ uncovers the ports 13ᵃ in the valve motive fluid at full pressure also becomes effective against the end of stem 5ᵇ so that the piston advances with full pressure on both its forwardly acting pressure areas. The piston advances freely due to the unrestricted escape of air in the forward end of the bore 4ᵃ through the main exhaust passage 17 and, after the closing of the latter by the piston, through the auxiliary exhaust comprising port 15ᵇ, passage 15ᵃ, branches 15ᶜ and 15ᶠ, forward groove 13ᶜ of the valve, and exhaust port 16. When the piston reaches the position shown in Fig. 2 it uncovers the main exhaust passage 17 thus venting the rearward end of piston bore 4ᵃ. At about the same time the piston stem 5ᵇ uncovers port 15 and admits motive fluid from the small bore 4ᵇ into passage 15ᵃ whence it extends in both directions, forwardly through port 15ᵇ to become effective against the front end of the piston head 5ᵃ to drive the piston rearwardly and rearwardly through passage 15ᶜ and branch 15ᵉ to become effective against the forward face of forward flange 13ᵇ to shift the valve rearwardly to the position shown in Fig. 2. Thereupon forward flange 13ᵇ of the valve opens port 15ᵈ to bore 4ᵇ and closes port 18 to the motive fluid supply but opens it to the auxiliary exhaust through its groove 13ᶜ and exhaust port 16. The piston now moves rearwardly against the constant pressure of motive fluid on the end of its stem 5ᵇ. Shortly after beginning its rearward movement piston stem 5ᵇ closes port 15 but motive fluid still continues to pass to the front end of piston bore 4ᵃ, through port 15ᵈ, branch 15ᵉ, passage 15ᵃ and port 15ᵇ, until 15ᵈ is in turn closed by the piston stem. The piston then moves rearwardly under the expansion of the motive fluid in the forward end of bore 4ᵃ until the main exhaust passage 17 is opened whereupon it continues to move rearwardly under its acquired momentum. By the time the end of the piston stem has closed the air inlet ports 13ᵃ in the valve the pressure on the forward end and forward face of the forward flange 13ᵇ is sufficiently reduced to be overcome by the pressure on the rearward edge of the valve, whereupon the valve moves forwardly and the parts assume the position shown in Fig. 1 thus completing the cycle.

In case the piston 5 should be at rest in the position shown in Fig. 1 with the valve in its rearmost position (Fig. 2) a restricted live air port 20 is provided connecting the live air chamber 14 with passage 18ᵃ to permit sufficient motive fluid to reach the rear end of the piston bore 4ᵃ to start the piston on its forward movement whereupon on uncovering the valve ports 13ᵃ the motive fluid thus admitted would become immediately effective to shift the valve to the forward position.

From the above it will be apparent that the present invention provides a fluid pressure tool of exceptionally compact construction, that the use of a sleeve valve eliminates the usual projection for the valve chamber with its added weight and increased bulk, that the use of a reversible valve of simple form and design adds to the simplicity and cheapness of the tool, and that the arrangement whereby two of the pressure areas of the piston are piston controlled while only one is valve controlled secures to a considerable extent the positive action of the valveless tool with the added advantage of relatively free movement of the piston resulting from the use of auxiliary valve controlled exhausts in addition to the main exhaust.

I claim as my invention:

1. In a fluid pressure tool, a cylinder having a differential piston chamber, a piston reciprocable therein providing two pressure areas for driving it in one direction and a single pressure area for returning it, ports and passages controlled by said piston for admitting motive fluid to two of said areas, and a sleeve valve defining a portion of said piston chamber and moving in timed relation with said piston for controlling the admission of motive fluid to the other pressure area of the piston.

2. In a fluid pressure tool, a cylinder having a differential piston chamber, a piston reciprocable therein, providing two pressure areas for driving it in one direction and a single pressure area for returning it, ports and passages controlled by said piston for admitting motive fluid to two of said areas, a sleeve valve defining a portion of said piston chamber and moving in timed relation with said piston for controlling the admission of motive fluid to the other pressure area of the piston, a main exhaust controlled by said piston for the portion of the piston chamber adjacent two of said areas, and auxiliary exhaust means controlled by said valve for one of said last named areas.

3. In a fluid pressure tool, a cylinder having a differential piston chamber, a piston reciprocable therein, providing two pressure areas for driving it in one direction and a single pressure area for returning it, ports and passages controlled by said piston for admitting motive fluid to two of said areas, a sleeve valve defining a portion of said piston chamber and moving in timed relation with said piston for controlling the admission of motive fluid to the other pressure area of the piston, a main exhaust controlled by said piston for the portion of the piston chamber adjacent two of said areas, and auxiliary exhaust means controlled by said valve for both of said last named areas.

4. In a fluid pressure tool, a cylinder having a differential piston chamber, a piston reciprocable therein, providing two pressure areas for driving it in one direction and a single pressure area for returning it, ports and passages controlled by said piston for admitting motive fluid to two of said areas, a sleeve valve defining a portion of said piston chamber and moving in timed relation with said piston for controlling the admission of motive fluid to the other pressure area of the piston, a main exhaust controlled by said piston for the portion of the piston chamber adjacent two of said areas, one of which is the said valve controlled area, and auxiliary exhaust means controlled by said valve for one of said last named areas.

5. In a fluid pressure tool, a cylinder having a differential piston chamber, a piston reciprocable therein, providing two pressure areas for driving it in one direction and a single pressure area for returning it, ports and passages controlled by said piston for admitting motive fluid to two of said areas, a sleeve valve defining a portion of said piston chamber and moving in timed relation with said piston for controlling the admission of motive fluid to the other pressure area of the piston, a main exhaust controlled by said piston for the portion of the piston chamber adjacent two of said areas, one of which is the said valve controlled area, and auxiliary exhaust means controlled by said valve for both of said last named areas.

6. In a fluid pressure tool, a cylinder providing a differential piston chamber, a differential piston reciprocable therein comprising a head and a projecting stem of smaller diameter, a sleeve valve defining a portion of the piston chamber into which the stem of the piston passes, said valve having ports controlled by said stem continuously in communication with the motive fluid supply, means controlled by said piston for admitting motive fluid to one of the pressure areas of the piston head, and means controlled by said valve for admitting motive fluid to the other pressure area of said head.

7. In a fluid pressure tool, a cylinder providing a differential piston chamber, a differential piston reciprocable therein comprising a head and a projecting stem of smaller diameter, a sleeve valve defining a portion of the piston chamber into which the stem of the piston passes, ports and passages controlled by said valve for controlling the admission of motive fluid to the rear face of the piston head said valve having live air ports controlled by the piston stem, means controlled by said piston stem for periodically admitting motive fluid for a limited period to the front face of the piston head to effect the rearward stroke of the piston, and means controlled jointly by said valve and said piston stem for admitting motive fluid for a further period to the front face of the piston head.

8. In a fluid pressure tool, a cylinder providing a differential piston chamber, a differential piston reciprocable therein comprising a head and a projecting stem of smaller diameter, a sleeve valve defining a portion of the piston chamber into which the stem of the piston passes, said valve having live air ports controlled by said stem, means controlled by said piston for admitting motive fluid to the other pressure area of said head, a piston controlled main exhaust for the chamber on both sides of said piston head, and auxiliary valve controlled exhaust means for one side of said piston head.

9. In a fluid pressure tool, a cylinder providing a differential piston chamber, a differential piston reciprocable therein comprising a head and a projecting stem of smaller diameter, a sleeve valve defining a portion of the piston chamber into which the stem of the piston passes, ports and passages controlled by said valve for controlling the admission of motive fluid to the rear face of the piston head said valve having live air ports controlled by the piston stem, means controlled by said piston stem for periodically admitting motive fluid for a limited period to the front face of the piston head to effect the rearward stroke of the piston, and means controlled jointly by said valve and said piston stem for admitting motive fluid for a further period to the front face of the piston head, a piston controlled main exhaust for both faces of said piston head, and auxiliary valve controlled exhaust means for one face of said piston head.

10. In a fluid pressure tool, a cylinder having a differential piston chamber, a two diameter piston reciprocable therein having a head and a stem, a sleeve valve at one end of the piston chamber and defining a part thereof and moving in timed relation with said piston, said valve having ports therethrough under control of the piston stem for admitting motive fluid against the end thereof, means including a flange on said valve for controlling the admission of motive fluid against the rear face of the piston head, means including a groove on said valve flange for providing an auxiliary exhaust for said last named pressure area of the piston, a piston controlled main exhaust, and piston controlled means for supplying motive fluid to the forward face of the piston head.

11. In a fluid pressure tool, a cylinder having a differential piston chamber, a two diameter piston reciprocable therein having a head and stem, a sleeve valve at one end of the piston chamber and defining a part thereof and moving in timed relation with said piston, said valve having ports therethrough under control of the piston stem for admitting motive fluid against the end thereof, a piston controlled exhaust for the end faces of the piston head, piston controlled means for admitting motive fluid to the forward face of the piston head, means including a flange on said valve for controlling the admission of motive fluid to the rear face of said piston head, and auxiliary exhaust means for both faces of said piston head including a groove in the exterior of said valve flange.

Signed by me at Detroit, Michigan, this 20 day of May 1925.

EDWARD W. STEVENS.